June 2, 1936. H. W. RUPPLE 2,042,555
CHUCK MECHANISM FOR AUTOMATIC MACHINE TOOLS
Filed Jan. 2, 1932 6 Sheets-Sheet 5
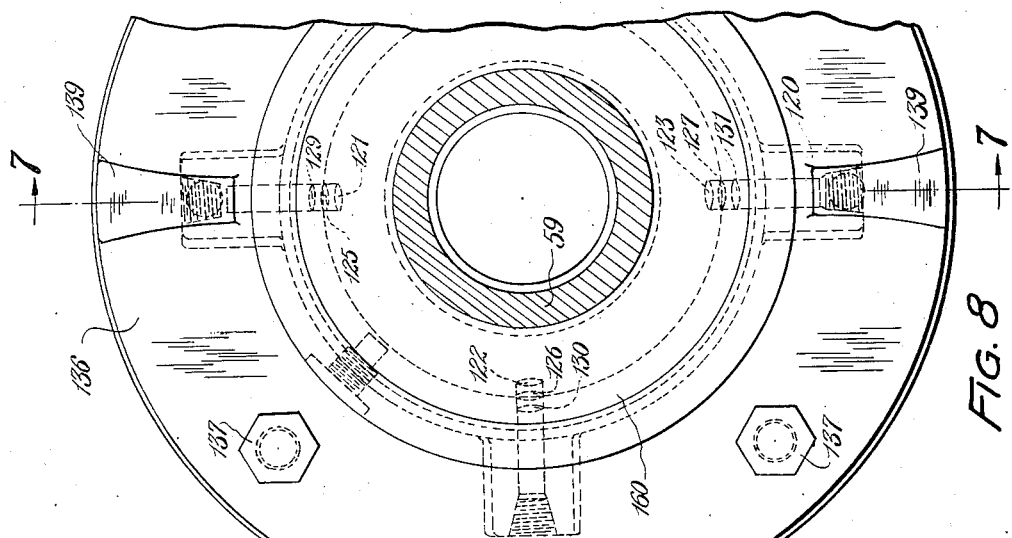
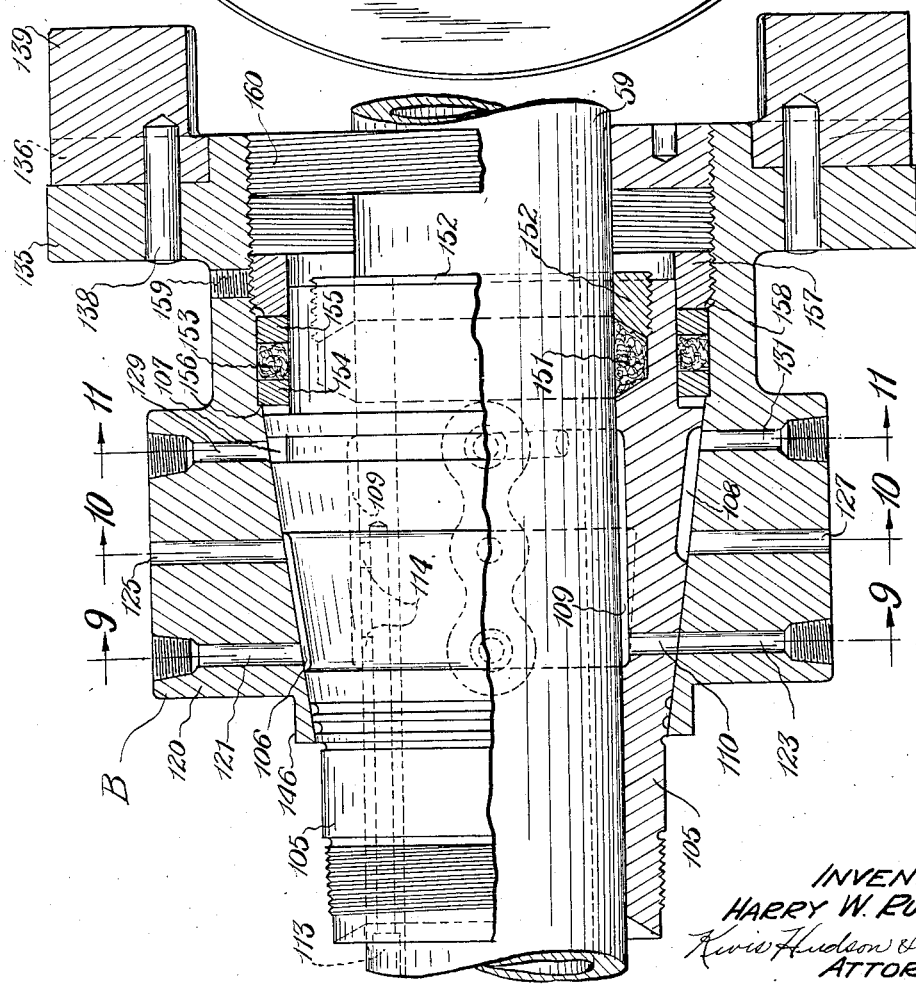
INVENTOR:
HARRY W. RUPPLE
Kwis Hudson & Kent
ATTORNEYS

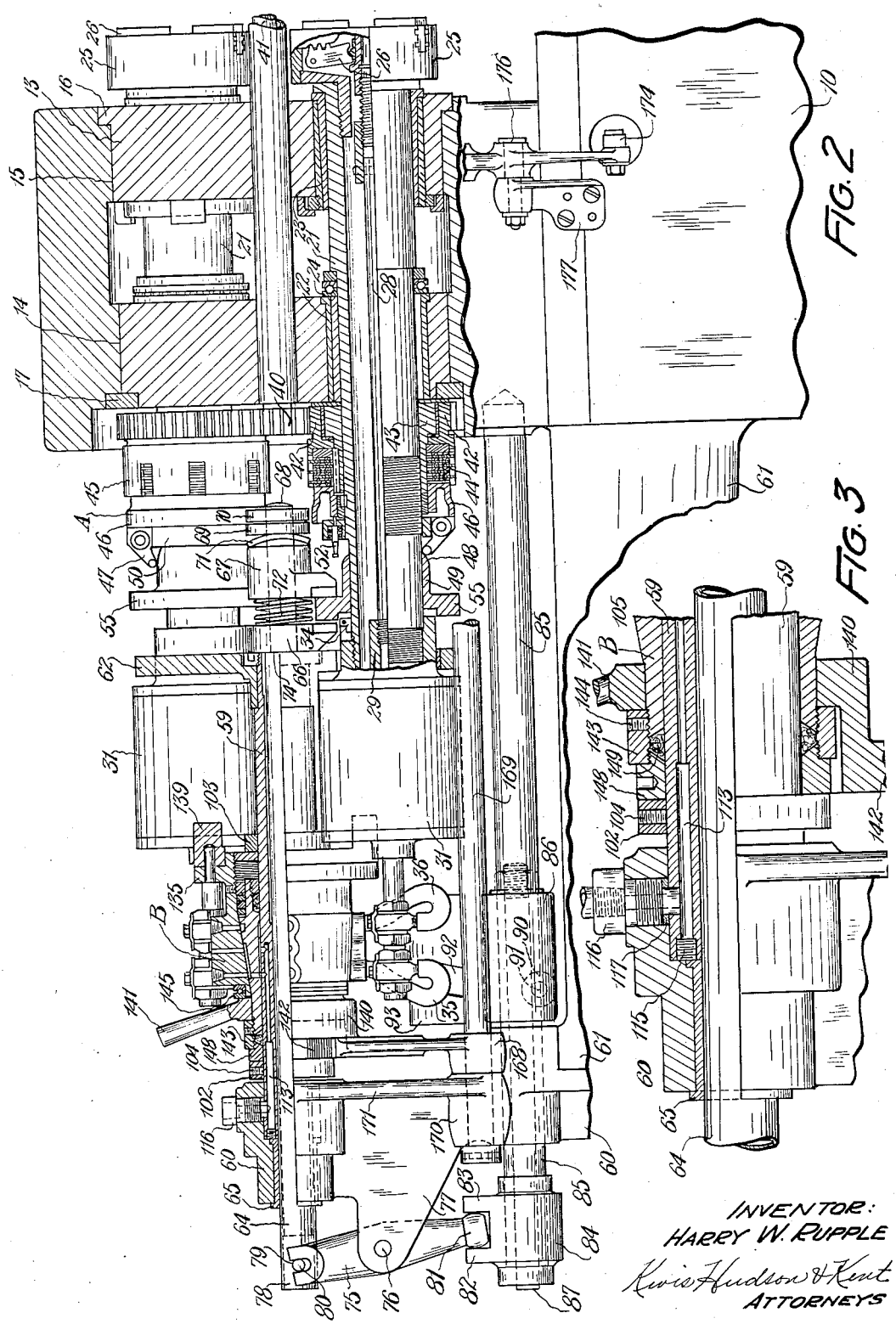

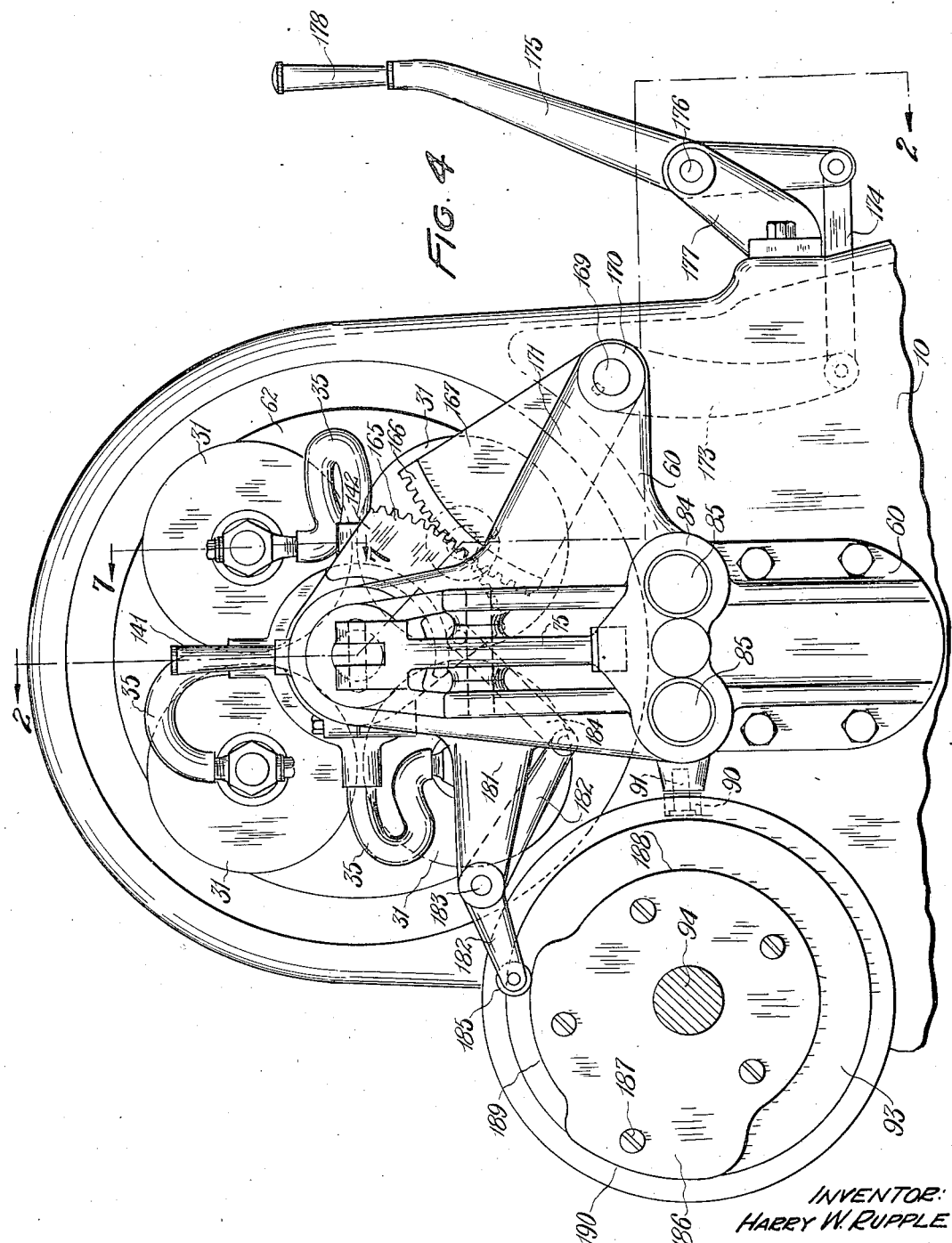

INVENTOR:
HARRY W. RUPPLE
ATTORNEYS

Patented June 2, 1936

2,042,555

UNITED STATES PATENT OFFICE 2,042,555

CHUCK MECHANISM FOR AUTOMATIC MACHINE TOOLS

Harry W. Rupple, Shaker Heights, Ohio, assignor to The Cleveland Automatic Machine Company, Cleveland, Ohio, a corporation of Ohio Application January 2, 1932, Serial No. 584,421

37 Claims. (Cl. 29—38)

This invention relates to metal working machine tools and more particularly to the spindle driving and chuck operating mechanism of a multiple spindle indexible type of automatic chucking machine.

In machines of the general character referred to the work is usually supported in a chuck carried by a rotatable spindle supported in a rotatable spindle turret. A plurality of spindles are equally spaced about the axis of the spindle turret which is intermittently rotated to move the spindles and work from station to station where the necessary machining operations are performed upon the work by one or a plurality of tools. One of the stations is a loading station where the finished work is removed and a new blank inserted either by manual or automatic means.

An object of the present invention is the provision of a novel means for driving the spindles and operating the chucks of a machine tool of the type referred to.

Another object of the invention is the provision of a novel valve for controlling the flow of fluid to a fluid pressure motor.

Another object of the invention is the provision of a novel valve for controlling the flow of fluid pressure to a motor carried by an indexible turret and operatively connected to mechanism carried by said turret.

Another object of the invention is the provision of a novel fluid pressure actuated means for operating mechanism connected to or carried by the spindle of a machine of the type referred to, which will be simple and economic in construction and reliable in operation.

Another object of the invention is the provision of fluid pressure means for opening and closing a chuck, carried by a turret and indexed through a plurality of stations, while the turret is stationary with the chuck in the loading station.

Another object of the invention is the provision of a novel metal working indexible type of automatic machine having a fluid pressure motor carried by the spindle and a means for controlling the flow of pressure to the motor mounted in axial alignment with the spindle turret.

Another object of the invention is the provision of a machine having an indexible turret and one or a plurality of chucks carried thereby, fluid pressure operated motor carried by said turret for opening and/or closing said chucks, means for indexing said turret and operating said motor while the turret is stationary.

Further objects and advantages of the invention will be apparent to those skilled in the art from the following description of the preferred embodiment of the invention described with reference to the accompanying drawings, in which Figure 1 is a front elevational view of the spindle end of a machine tool embodying the present invention;

Fig. 2 is a view similar to Fig. 1 with the right hand part shown in section on the line 2—2 of Figs. 4 and 5 and the left hand part showing a section on the vertical center line of the machine;

Fig. 3 is a detailed view of a portion of the valve mechanism shown in section on the line 2—2 of Figs. 4 and 5;

Fig. 4 is an end elevation of the machine looking from the left as viewed in Figs. 1 and 2;

Fig. 7 is a sectional view of the control valve taken on the line 7—7 of Fig. 8 with portions shown in elevation; the relative position of the parts being the same as that shown in Figs. 1 and 2;

Fig. 8 is an end view of the control valve looking from the right as viewed in Fig. 7;

Similar reference characters indicate corresponding parts throughout the several figures of the drawings.

Figure 1:
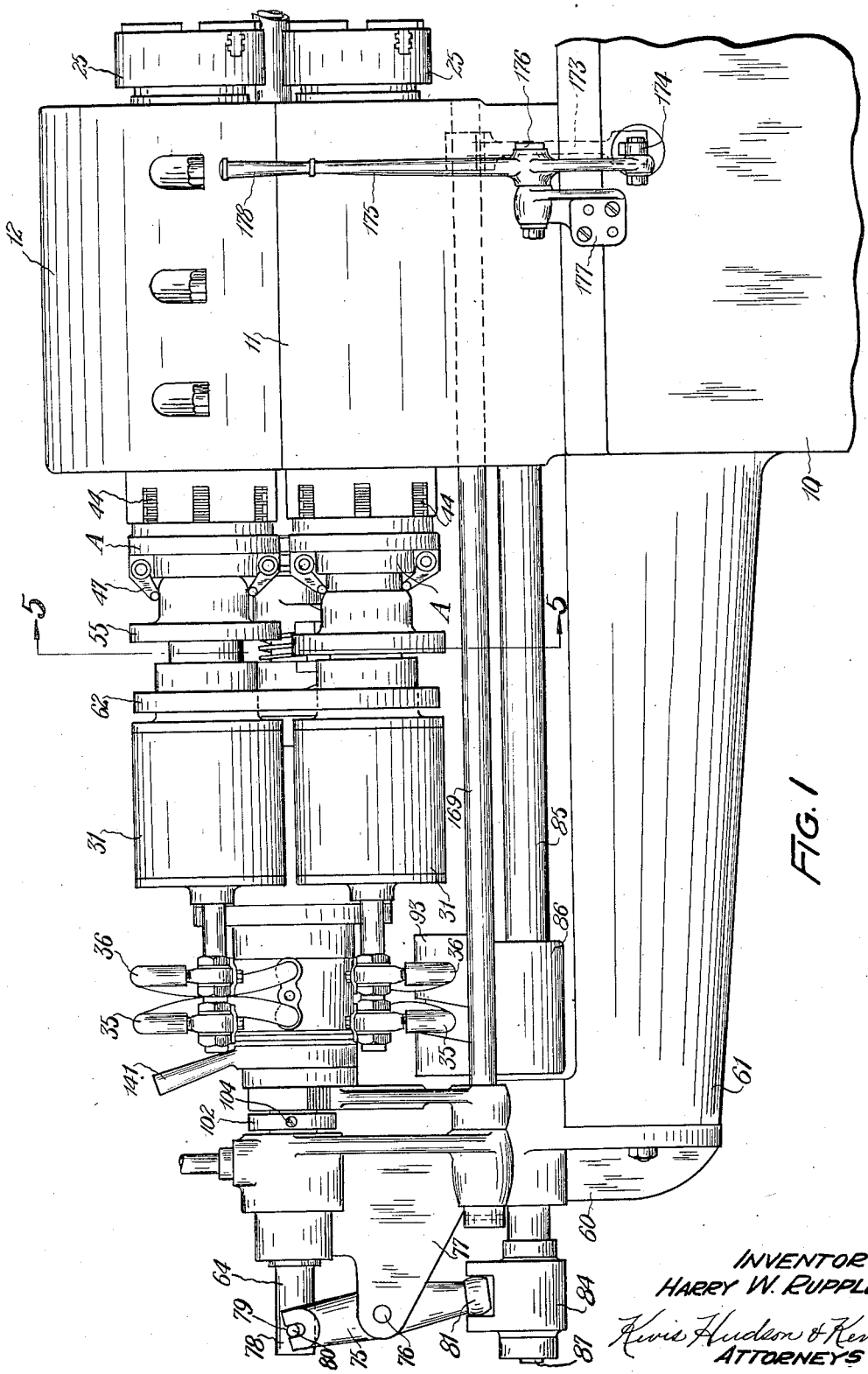

Referring to the drawings, reference character 10 designates the bed of an automatic metal working machine tool of a well known type. Only the work spindle end of the machine is illustrated, the remainder of the machine being old in the art and found in a plurality of different embodiments. A spindle head 11 formed integral with one end of the bed 10 and including a cap member 12, rotatably supports a spindle turret 13 by means of bearings 14 and 15 formed on the interior thereof. Longitudinal movement of the spindle turret 13 in the bearings 14 and 15 is prevented by a flange 16 formed integral with one end of the turret and a detachable ring 17 secured to the other end in any suitable manner.

A plurality of work spindles A, in the present instance four, are rotatably supported in suitable longitudinal apertures in the spindle turret 13, equally spaced about the axis of the turret. In Fig. 2 the upper front spindle does not show and the lower front spindle is shown partly in section. The spindles A are identical in construction and include a spindle tube 21 rotatably supported in tapered bearings 22 and 23 provided with means to take up wear and a thrust bearing 24 to take the end thrust of the spindle. The means shown for supporting the spindles A is similar to that shown in my copending application Serial No. 579,518, filed December 7, 1931.

The spindle tube 21 carries on the right hand end thereof, as viewed in Figs. 1 and 2, a chuck 25, the jaws 26 of which are opened and closed by mechanism indicated in general by the reference character 27, upon longitudinal reciprocation of a shaft or rod 28. The shaft 28 is supported at one end by the chuck 25 and at the other end is operatively connected by means of a coupling 29 to a piston 30 of a fluid pressure motor 31 carried on the left hand end of the spindle tube 21. The motor 31 is provided with a longitudinally projecting flange portion 32 of reduced diameter which is threaded onto the spindle tube 21 as at 33 and locked in any predetermined position by a lock member 34.

Figure 6:
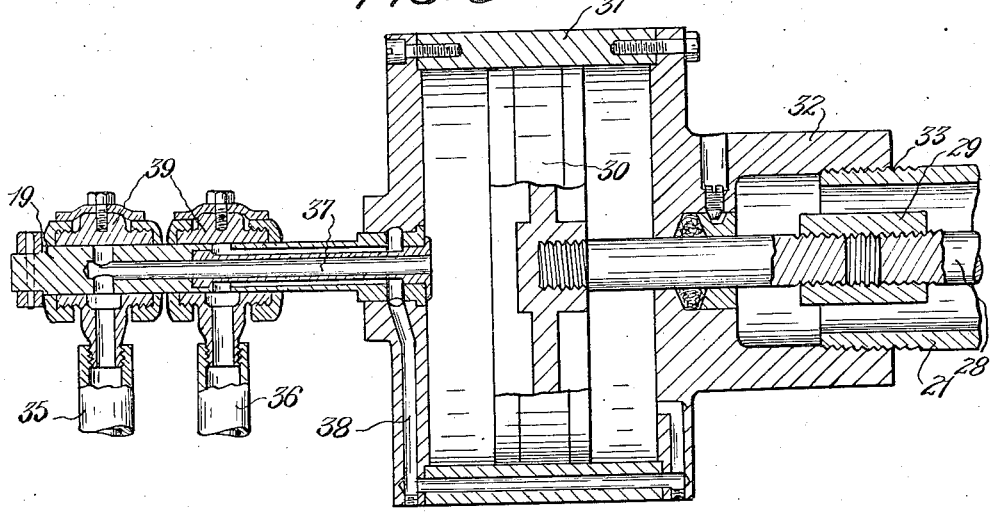
Fig. 6 is a detailed sectional view of one of the fluid pressure motors carried by the spindles of the machine.

Fluid under pressure is conducted to and exhausted from opposite sides of the piston 30 by means of flexible tubes 35 and 36 communicating with opposite sides of the piston through ports 37 and 38 respectively, and couplings 39 rotatably supported on a tubular member 19 fixed to the motor 31. The construction is such that when fluid under pressure is admitted through tube 35 and port 37 to the left hand side of the piston, as viewed in Figs. 1, 2 and 6, with the right hand side opened to exhaust through tube 36 and port 38, the piston 30, together with the shaft 28, is moved to the right and the chuck jaws 26 opened. When tube 36 is connected to the source of pressure and tube 35 opened to exhaust, the piston 30 and shaft 28 are moved in the reverse direction and the chuck jaws 26 closed. The valve for controlling the flow of fluid pressure to and from the motor 31 will be hereinafter described.

The spindles A are driven from a gear 40 keyed to the end of a shaft 41 extending through the center of the spindle turret 13 and driven from the main drive of the machine in a well known manner. A gear 42 continuously in mesh with gear 40, is rotatably mounted by means of suitable bearing members on an enlarged end of a sleeve member 43 threaded on the exterior of the spindle tube 21.

The spindle tube 21 is driven from the gear 42 through a friction disk clutch 44, opposite disks of which are carried by a longitudinally extending flange 45 formed integral with the gear 42 and the sleeve member 43. Pressure is applied to the disks through a member 46 slidably keyed to the sleeve member 43, by bellcrank levers 47, the long arms of which engage a cam surface 48 on a clutch thimble 49. The bellcrank levers 47 are carried on a collar member 50 threaded on the exterior of the spindle tube 21 and held in any adjusted position by a spring pressed plunger 52.

The clutch thimble 49 is slidably supported on the exterior of the spindle tube 21 and has a flange 55 formed integral therewith adapted to be engaged by mechanism, hereinafter described, which shifts the the same longitudinally of the spindle tube 21 to stop and start the spindle positioned in the loading station. The spindle driving mechanism just described is similar to that shown and described in my copending application Serial No. 575,734, filed November 18, 1931, to which reference is made for a detailed description of the same.

A tubular member 59 fixed at the left hand end, as viewed in Figs. 1 and 2, in a bracket 60 bolted or otherwise secured to a horn 61 of the bed 10 is supported at the other end in a disk member 62. The disk member 62 is supported by the motors 31 and is provided with a plurality of openings through which the reduced portion 32 of the motors project. A shaft 64 is slidably supported in the interior of the tubular member 59 and projects from either end thereof. A suitable bearing member 65 is fixed to the interior of the tubular member 59 at one end thereof.

Figure 5:
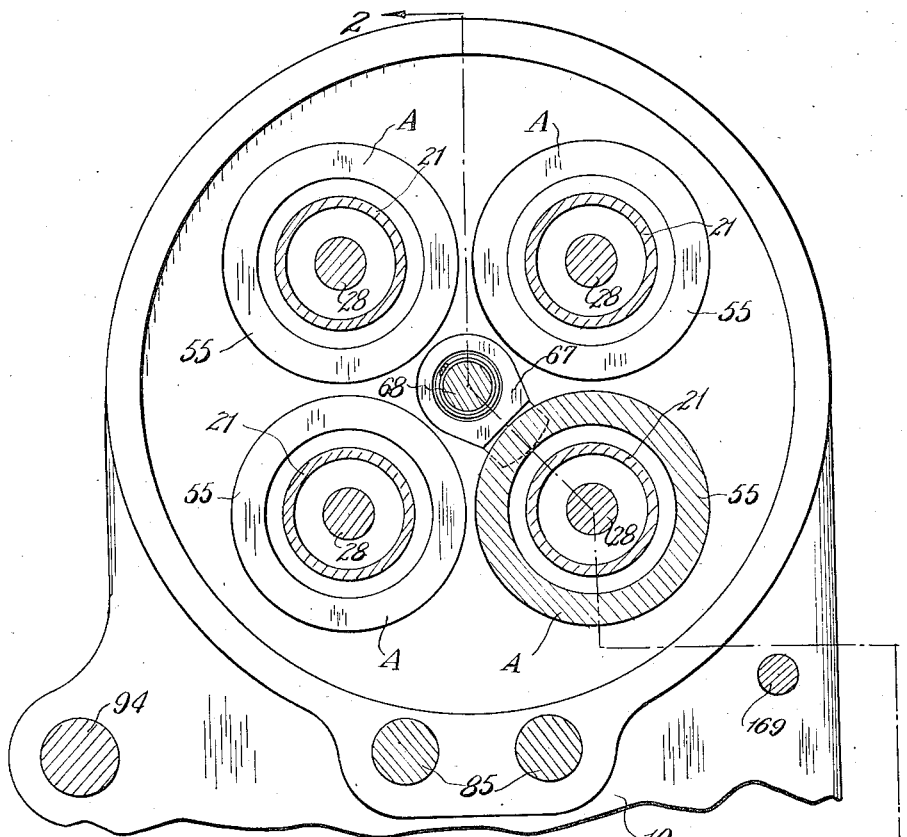
Fig. 5 is a sectional view taken on the line 5—5 of Fig. 1.

A pair of shoe members 66 and 67 slidably keyed to a reduced portion 68 of the shaft 64 are positioned to engage opposite sides of the flange 55 on the clutch thimble in the loading station which, as illustrated, is the lower front station, see Figs. 2 and 5. Adjusting nut 69 and lock nut 70 retain the shoe members 66 and 67 in position on the reduced portion 68. A spring washer 71 is positioned between the shoe member 67 and the nut 69, and a coil spring 72 surrounding the reduced portion 68 of the shaft 64 is positioned between the shoe members 66 and 67 which continuously urges these members apart. A finished surface 74 on the shoe member 66 is adapted to engage the adjacent surface of the disk member 62 and limit the movement of the shoe members 66 and 67 towards the left, as viewed in Fig. 2, as the shaft 64 is moved in that direction to relieve the friction disk clutch 44 and disconnect the spindle drive. After the surface 74 of the shoe member 66 strikes the disk member 62 continued movement of the shaft 64 causes the flange 55 of the spindle thimble 49 to be clasped or pressed between the shoe members 66 and 67, through the spring washer 70 producing a braking effect on the spindle and quickly stopping the same.

Shaft 64 is reciprocated in timed relation to the other operations of the machine to disconnect the spindle positioned in the loading station from the drive and apply the brake and after a predetermined time to release the brake and connect the spindle with the drive by the following mechanism. A lever 75 pivotally mounted on a pin 76 carried in projecting arm 77 formed integral with the bracket 60, has a forked upper end which projects on opposite sides of a rectangular end 78 formed on the shaft 64. The forked end of the lever 75 has open slots 79 formed therein into which the ends of a pin 80 carried by the part 78 of the shaft 64 projects. The lower end of the lever 75 has a finished head 81 formed thereon which engages in a groove formed by two projections 82 and 83 on a member 84. The member 84 is slidably supported on a pair of rods 85 fixed in the bracket 60 and the spindle head 11. A member 86 also slidably supported on the rods 85 is operatively connected to the member 84 by means of a rod 87 the length of which may be adjusted in any suitable manner. A cam roller 90 rotatably supported on a pin 91 fixed to the member 86 engages in a cam track 92 formed on a cam drum 93 fixed to the main cam shaft 94 of the machine.

The flow of fluid to and from the motors 31 carried by the spindles A is controlled by a single valve indicated in general by the reference character B rotatably mounted on the exterior of the tubular member 59 between two collars 102 and 103 held in any adjusted position on the tubular member 59 by set screws 104.

The inside valve member 105 of the valve B has an exterior conical surface provided with a plurality of ports or grooves 106, 107, and 108 and is rotatably mounted on the tubular member 59. An annular port or groove 109 is provided on the interior of the valve member 105. Apertures 110 and 111 extending through valve member 105 communicate with the port or groove 109 on the interior of the valve member and the exterior of the valve member and port or groove 107 respectively. Fluid under pressure is admitted to the valve B through a longitudinal port or aperture 113 formed in the wall of the tubular member 59 and openings 114 communicating therewith and the port or groove 109 formed on the interior of the valve member 105.

The port or aperture 113 is closed at the left hand end, as viewed in Fig. 2, by a plug 115 and is connected to a source of fluid pressure (not shown) by a coupling 116 threaded into an opening in the casting 60. The coupling 116 is provided with a reduced extension which fits into an opening in the wall of the tubular member 59 and is packed as at 117 to prevent leakage, in any suitable manner.

The exterior valve member 120 of the valve B is rotatably mounted on the conical surface of the inside valve member 105 and is provided with radial ports or openings 121 to 132 inclusive, see Figs. 7 to 14 inclusive. The exterior valve member 120 has a flange 135 formed integral with the right hand end thereof which supports an annular member 136 bolted thereto, as by the bolts 137. Dowel pins 138 are used to locate the annular member 136 on the flange 135. The annular member 136 carries two projections 139 which extend between two adjacent motors 31 and engage the cylinders thereof. The construction is such that as the spindle turret is indexed the valve B is rotated therewith due to the engagement of the projection 139 with the motors 31.

A member 140 slidably keyed to the valve member 105 adjacent one end of the conical surface thereof, carries a hand grasp 141 and a gear sector 142 formed integral therewith. The member 140 is adjustable longitudinally of the valve member 105 by means of a collar 143 threaded on the exterior of the valve member 105 to the left of the collar member 140. The collar 143 is held in any adjusted position by means of a set screw 144. An anti-friction bearing 145 supported on a reduced portion 146 of the valve member 120 is positioned between the members 140 and 120. A ring member 148 threaded into the interior of the collar 143 provides means for adjusting the packing 149 at one end of the valve B.

The right hand end of the valve is packed at two places. The inner packing 151 is adjusted by means of a ring member 152 threaded into an enlarged opening formed in one end of the member 105. The outer packing 153 is positioned between two annular rings 154 and 155 mounted on the exterior of the valve member 105. The ring 154 abuts against a shoulder 156 formed on the interior of the valve member 120 and the ring 155 is moved relative to the ring 154 by an annular member 157 threaded into the interior of the valve member 120 and provided with a flange 158 adapted to engage the ring 155. The annular member 157 is held in an adjusted position by means of a set screw 159. A disk shaped member 160 is threaded into the right hand end of the valve member 120, as viewed in Fig. 7.

Gear teeth 165 formed on the gear sector 142 are continuously in mesh with gear teeth 166 on a gear sector 167 formed integral with a boss 168 keyed to a shaft 169. The shaft 169 is rotatably supported at one end in a boss 170 formed integral with a projecting arm 171 of the bracket 60 and at the other end in suitable bearings in the spindle head 11. The shaft 169 has an arm 173 keyed thereto inside of the spindle head 11. The arm 173 is connected by means of a link 174 extending through the side of the bed 10, to the lower end of a lever 175 pivoted between the ends thereof on a pin 176 carried by a bracket 177 bolted or otherwise secured to the bed 10 of the machine. The upper end of the lever 175 has a hand grasp 178 formed thereon for manual operation of the same.

An arm 181, see Fig. 4, formed integral with and projecting from the bracket 60 towards the rear carries a bell crank lever 182 pivotally mounted on a pin 183 fixed in the end of the arm 181. One arm of the bell crank lever 182 is connected to the gear sector 142 by means of a link or rod 184 pivotally connected to both the bell crank lever 182 and the gear sector 142. The other arm of the bell crank lever 182 carries a cam roller 185 rotatably mounted in the end thereof and in engagement with a face cam 186 fixed to the end of the cam drum 93 as by the screws 187. The face cam 186 has three cam surfaces 188, 189 and 190 and the construction is such that the gear sector 142 and the interior valve member 105 of the valve B are rotated in a clockwise direction as viewed in Figs. 4 and 9 to 14 inclusive from the position shown in Figs. 12, 13 and 14, hereafter referred to as the normal position of the valve, ninety degrees in two movements of forty-five degrees each, upon each rotation of the cam shaft 94.

Ports 121 to 124 inclusive are spaced ninety degrees apart and are located adjacent the left hand end of the valve member 120. Ports 125 to 128 inclusive are in the center of the valve member 120 and ports 129 to 132 inclusive are adjacent the right hand end thereof. Ports 121 to 124 inclusive are connected to the flexible tubes 35 which communicate with the left hand side of the motor 31. Ports 125 to 128 inclusive are open to the atmosphere and ports 129 to 132 inclusive are connected to the flexible tube 36 which communicates with the right hand side of the motor 31.

The port 106 extends about the periphery of the valve member 105 for a distance greater than 270° and is of sufficient length to connect the ports 121 etc. in the left hand end of the valve member 120 with the exhaust ports 125 etc. in the center of the valve member 120. Port 110 is merely an opening extending through the valve member 105 midway between the ends of port 106 and communicating with the lefthand ports 125 etc. only. Port 107 is an annular groove extending about the periphery of the interior valve member 105 a distance corresponding to port 106 and is in communication with the port 109 formed on the interior of the valve member 105 through the port or opening 111. Port 108 is a longitudinally extending groove formed on the exterior of the valve member 105 in longitudinal alignment with port 110 and of sufficient length to connect the right hand ports 129 etc. with the exhaust ports 125 etc.

Figure 12:
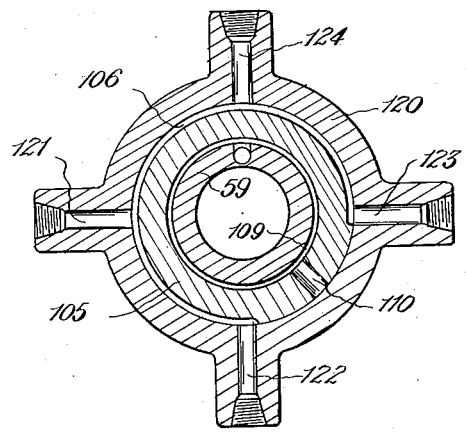
Fig. 12 is a sectional view of the control valve similar to Fig. 9, but with the valve in a different operating position.
Figure 13:
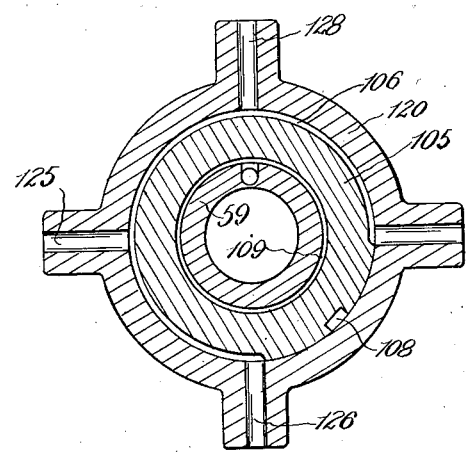
Fig. 13 is a sectional view of the control valve similar to Fig. 10, but with the valve in the position shown in Fig. 12.
Figure 14:
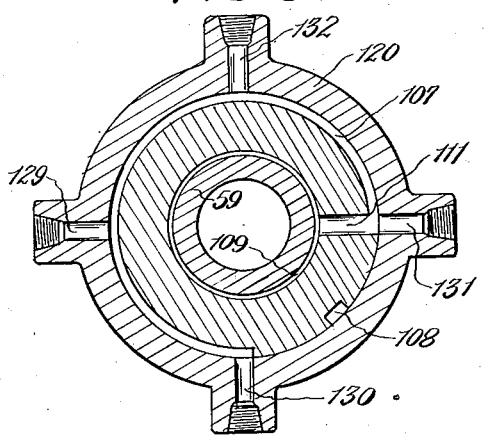
Fig. 14 is a sectional view of the control valve similar to Fig. 11, but with the valve in the position shown in Figs. 12 and 13.

The machine is illustrated in the drawings except for Figs. 12, 13 and 14, with the lower front spindle in the loading station and at rest with the chuck opened. The normal position of the machine referred to above, is with all the spindles rotating and the chucks closed, a condition which exists during and for a short interval of time before and after each indexing operation. The position of the valve A immediately after the indexing operation is shown in Figs. 12, 13 and 14.

The operation of the machine is as follows: Assuming that the ports are in the relative positions illustrated in Figs. 1 to 11 inclusive, the spindles A, except the one in the loading station, the lower front position, are rotating with the chuck closed. The lower front spindle is stopped with the brake applied and the clutch 44 released. The valve B is in the position illustrated in Figs. 7 to 11 inclusive. The left hand end of the motors 31 on the rotating spindles is connected to the exhaust ports 125, 126 and 128 through the flexible tubes 35 and the ports 121, 122, 124 and 106. The right hand ends of the motors 31 on the rotating spindles are connected to the fluid pressure supply line through the flexible tubes 36 and the ports 129, 130, 132, 107, 109, 111 etc. The left hand end of the motor 31 on the spindle in the loading station is connected to the fluid pressure supply through the flexible tube 35 the ports 123, 109 and 110. The right hand end of the motor 31 on the spindle in the loading station is connected to the exhaust through the flexible tube 36 and the ports 131, 108 and 127.

A work blank is positioned in the chuck on the loading station either by manual or automatic means, and continued operation of the machine causes the cam roller 185 to ride on the high surface 190 of the cam plate 186 and rock the bell crank lever 182 moving the gear sector 142 and the valve member 105 forty-five degrees in a clockwise direction, as viewed in Figs. 4 and 9 to 14 inclusive. During this movement of the valve member 105 the fluid pressure remains connected to the right hand end of the motors 31 on the revolving spindles, and the other ends of the motor remain open to exhaust; the flow of fluid to the motor on the station spindle is reversed causing the piston to move to the left and close the chuck.

After the chuck closes to engage the work the spindle brake is released, and the clutch 44 engaged due to the movement of rod 64 and the shoes 66, 67, etc. under the control of the cam drum 93. The spindle turret is then indexed in a counter-clockwise direction to bring the following spindles into the loading station. As the spindle turret indexes the entire valve B, the gear sector 142, the bell crank lever 182, and the lever 175, are rotated in the same direction ninety degrees due to the engagement of the projection 139 between the adjacent top and bottom motors 31. Upon the completion of this operation, the valve B is in the position illustrated in Figs. 12, 13 and 14, and the cam roller 185 is on the lower surface 188 of the face cam 186.

The spindle just loaded has now moved to the upper front station where the machining operation commences or continues as the case may be. The spindle in the loading station is ready to have the finished work removed and a new blank loaded. The rod 64 together with the shoes 66 and 67 etc. moves to the left under the control of the cam drum 93, releasing the clutch carried by the spindle in the loading station and applying the brake to the spindle to quickly bring the same to rest. Since both valve members 105 and 120 rotate together during the indexing operation, their relative positions remain unchanged with the fluid pressure source connected to the right hand end of the motors 31 and the other end of the motors open to exhaust.

Figure 9:
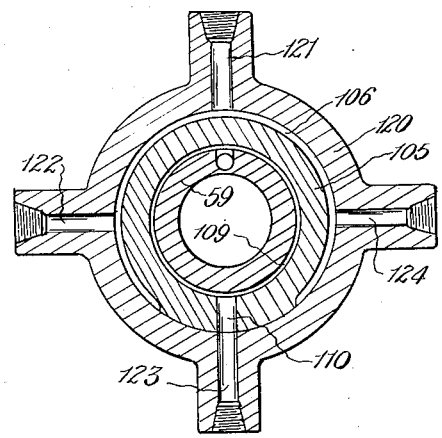
Fig. 9 is a sectional view of the control valve taken on the line 9—9 of Fig. 7.
Figure 10:
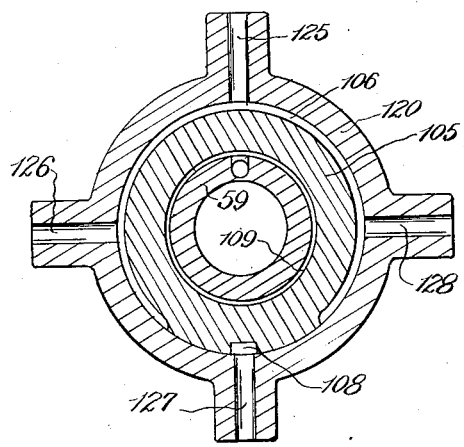
Fig. 10 is a sectional view of the control valve taken on the line 10—10 of Fig. 7.
Figure 11:
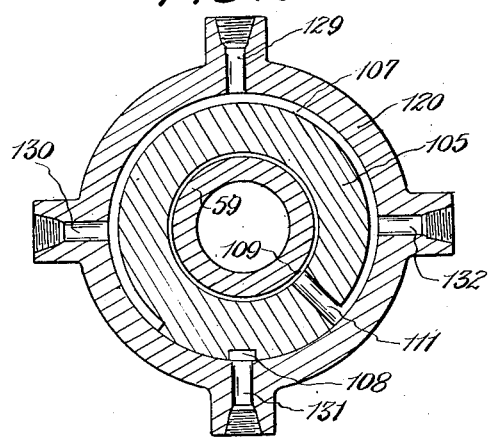
Fig. 11 is a sectional view of the control valve taken on the line 11—11 of Fig. 7.

After the spindle in the loading station has come to rest the cam roller 185 rides up on the intermediate face 189 of the face cam 186, rocking the bell crank lever 182 and rotating the gear sector 142 together with the valve member 105 forty-five degrees in a clockwise direction. The valve moves from the position shown in Figs. 12, 13 and 14 to a position similar to that shown in Figs. 9, 10 and 11, the only difference being that the valve member 120 together with the ports 129, 130, 131 and 132 have been indexed ninety degrees in a counter-clockwise direction. As the relative positions of the ports are the same as illustrated in Figs. 9, 10 and 11, the direction of flow of fluid pressure to the motor 31 on the spindle A in the loading station will be reversed and the chuck carried by said spindle opened.

From the above disclosure it will be apparent that as the cycle of operation of the machine continues the inside valve member 105 will be oscillated through an angle of ninety degrees, in a counter-clockwise direction with the indexing of the spindle turret and in the clockwise direction in two movements of forty-five degrees each under the control of the face cam 186. It will also be apparent that the exterior valve member 120 will be indexed through angles of ninety degrees with the indexing of the spindle turret. This indexing of the valve member 120 causes the different ports connected with any one motor 31 to successively pass through the bottom position as the motor 31 connected thereto is in the loading station.

While the invention has been disclosed as applied to a four spindle machine loaded at the lower front station, it is to be understood that it may be applied to a machine having one or a plurality of spindles and a plurality of stations, any one of which may be the loading station, and the valve illustrated may be modified within the scope of this invention to control one or a plurality of motors. Although the fluid pressure motors carried by the spindles A are shown operatively connected to the chuck, they may be used to operate any mechanism carried by the spindles.

The preferred embodiment of the invention has been illustrated and described, but I do not wish to be limited to the particular construction shown, which may be varied within the scope of the invention, and I particularly point out and claim as my invention:

1. In a machine of the character described, the combination of a frame, a spindle turret rotatably supported by said frame, a plurality of spindles rotatably supported in said spindle turret, power means for driving said spindles, means carried by each spindle for connecting said power means to and from said spindle, chucks carried by said spindles, means for operating said chucks, fluid pressure motors carried by said spindles and connected to one of said means, a stationary member carried by said frame in axial alignment with said spindle turret, an inner valve member rotatably supported about said stationary member, an outer valve member rotatably supported about said inner valve member, means for simultaneously rotating said valve members concomitant with said spindle turret, means for moving said inner valve member in a reverse direction to the said simultaneous rotation, said valve members being provided with a plurality of ports adapted to control the flow of fluid pressure to said motors whereby the actuation of the motors is controlled.

2. In a machine of the character described, the combination of a stationary member, a valve member rotatably supported by said stationary member, a second valve member rotatably supported by said stationary member, an inlet port in said stationary member communicating with one of said valve members and adapted to be connected to a source of fluid supply, a plurality of ports in said second valve member adapted to be connected to a plurality of motors, a plurality of ports in said valve member adapted to direct the flow of fluid through said valve members, means for oscillating one of said valve members, and means for rotating one of said valve members.

3. In a machine of the character described, the combination of a frame, a spindle turret rotatably supported by said frame, a plurality of spindles rotatably supported in said spindle turret, a plurality of slidable members carried by said spindles, fluid pressure motors carried by said spindles and connected to one of said slidable members, a stationary member carried by said frame in axial alignment with said spindle turret, an inner valve member rotatably supported about said stationary member, an outer valve member rotatably supported about said inner valve member, means for simultaneously rotating said valve members concomitant with the rotation of said spindle turret, and means for moving said inner valve member in a reverse direction to said simultaneous rotation, said valve member being provided with a plurality of ports adapted to control the flow of fluid pressure to said motors.

4. In a machine of the character described, the combination of an indexible turret, a plurality of work engaging means supported by said turret, a plurality of fluid presure operated means operatively connected to said work engaging means, a valve comprising two relatively movable parts and adapted to control the flow of fluid to a plurality of said motors, means for automatically indexing said valve as a unit with said turret, and automatic means for actuating said valve in predetermined timed relation to the indexing of said turret.

5. In a machine of the character described, the combination of an indexible spindle turret, a plurality of spindles supported by said spindle turret, each of said spindles comprising a movable member and a fluid pressure operated motor operatively connected to said movable member, a valve for controlling the flow of fluid to said motors adapted to operate said movable members in sequence, said valve comprising relatively movable parts indexible with said turret as a unit operatively connected to a plurality of said motors, and automatic means for moving said parts relative to each other.

6. In a machine of the character described, the combination of an indexible spindle turret, a plurality of spindles supported by said spindle turret, each of said spindles comprising a movable member and a fluid pressure operated motor operatively connected to said movable member, a valve comprising two relatively movable parts indexible with said turret as a unit operatively connected to a plurality of said motors adapted to control the flow of fluid to said motors, and automatic means for producing a relative movement between the relatively movable parts of said valve to operate said motors in sequence.

7. In a machine of the character described, the combination of an indexible spindle turret, a plurality of spindles supported by said spindle turret, each of said spindles comprising a movable member and a fluid pressure operated motor operatively connected to said movable member, a valve comprising relatively movable members operatively connected to a plurality of said motors for controlling the flow of fluid to said motors, means for indexing said valve as a unit with said turret, and automatic means for producing a relative movement between said members in predetermined timed relation to the indexing of said turret.

8. In a machine of the character described, the combination of a frame, a cam shaft rotatably supported by said frame, a plurality of spindles rotatably supported by said frame, means for driving said spindles, a plurality of chucks supported by said spindles, a plurality of means for operating said chucks, a plurality of fluid pressure operated means supported by said spindles and operatively connected to one of said last mentioned means, a valve for controlling the flow of fluid to a plurality of said fluid pressure operated means, said valve having ports therein adapted to supply fluid to positively actuate said fluid pressure operated means in different directions, and means for controlling said valve from said cam shaft.

9. In a machine of the character described, the combination of a plurality of rotatable spindles, means for connecting and disconnecting said driving means to and from said spindles, chucks carried by said spindles, a fluid pressure motor carried by said spindles, means operatively connecting said fluid pressure motors and said chucks, a valve comprising relatively movable parts for controlling the flow of fluid to a plurality of said motors, said valve being provided with ports adapted to positively actuate said motors in opposite directions, and automatic means for actuating said valve in predetermined timed relation to the connecting and disconnecting of said driving means with said spindles.

10. In a machine of the character described, the combination of a plurality of rotatable spindles, means for driving said spindles, a clutch carried by each of said spindles adapted to connect and disconnect the same with said means, a chuck supported by each of said spindles, automatic means for operating said clutch at predetermined intervals, a fluid pressure motor operatively connected to each of said chucks, a valve for controlling the flow of fluid to a plurality of said motors, said valve being provided with ports adapted to supply fluid to positively operate said motors in opposite directions, and means for automatically controlling said valve whereby the same is operated in predetermined timed relation to the operation of said clutches.

11. In a machine of the character described, the combination of a frame, a plurality of spindles rotatably supported by said frame, means for driving said spindles, a brake adapted to be applied to each of said spindles, means for engaging and disengaging said driving means to and from said spindles and releasing and applying said brake, a chuck carried by each of said spindles, a fluid pressure operated motor carried by each of said spindles, means for operatively connecting said fluid pressure operated motors and said chucks, a valve for controlling the flow of fluid to a plurality of said fluid pressure operated motors, said valve having ports therein adapted to operate said fluid pressure operated motors positively in opposite directions, and automatic means for controlling the operation of said valve in predetermined timed relation to the operation of said second mentioned means.

12. In a machine of the character described, the combination of a frame, a plurality of spindles rotatably supported by said frame, means for driving said spindles, a brake adapted to be applied to each of said spindles, means for disengaging said driving means successively from said spindles and applying the brake to the spindle disengaged, a chuck carried by each of said spindles, a fluid pressure motor carried by each of said spindles, means for operatively connecting said chucks and said fluid pressure motors, a valve for controlling the flow of fluid to a plurality of said motors, said valve being provided with ports whereby said motors are positively operated in opposite directions, and automatic means for operating said second mentioned means and said valve in predetermined timed relation.

13. In a machine of the character described, the combination of a frame, a spindle turret rotatably supported by said frame, a cam shaft rotatably supported by said frame, a spindle rotatably supported in said spindle turret and adapted to be indexed through a plurality of stations, a member movably supported by said spindle, a fluid pressure motor carried by said spindle and operatively connected to said member, valve means comprising relatively movable parts mounted coaxially with said turret for controlling the supply of fluid to said motor, and means operatively connected to said cam shaft for automatically controlling said valve means.

14. In a machine of the character described, the combination of a frame, a spindle turret rotatably supported by said frame, means for indexing said spindle turret, a cam shaft rotatably supported by said frame, a spindle rotatably supported by said spindle turret and adapted to be indexed through a plurality of stations, a member movably supported by said spindle, a fluid pressure motor carried by said spindle and operatively connected to said member, valve means comprising relatively movable parts mounted coaxially with said turret for controlling the supply of fluid to said motor, and means operatively connected to said cam shaft for automatically actuating said valve means in predetermined timed relation with the indexing of said turret.

15. In a machine of the character described, the combination of a frame, a spindle turret rotatably supported by said frame, means for indexing said spindle turret, a plurality of spindles rotatably supported by said spindle turret, a chuck carried by each of said spindles, a fluid pressure motor carried by each of said spindles, means operatively connecting said fluid pressure motors and said chucks, a valve comprising relatively movable parts for controlling the flow of fluid to a plurality of said motors, said valve being provided with ports adapted to control the flow of fluid to positively actuate said motors in opposite directions, and automatic means for operating said valve in predetermined timed relation with the indexing of said turret.

16. In a machine of the character described, the combination of a frame, a cam shaft rotatably supported by said frame, an indexible spindle turret rotatably supported by said frame, means operatively connected to said cam shaft and said turret for periodically indexing said turret, a plurality of spindles rotatably supported by said turret, a chuck carried by each of said spindles, a fluid pressure motor carried by each of said spindles, means operatively connecting said fluid pressure motors and said chucks, a valve comprising relatively movable parts for controlling the flow of fluid to a plurality of said motors, and means operatively connecting said valve and said cam shaft adapted to operate said valve in predetermined timed relation to the indexing of said spindle turret.

17. In a machine of the character described, the combination of a frame, a cam shaft rotatably supported by said frame, a spindle turret rotatably supported by said frame, means operatively connected to said cam shaft and said spindle turret for automatically indexing said spindle turret, a plurality of spindles rotatably supported by said spindle turret, means for driving said spindles, means for connecting and disconnecting said means to and from said spindles, a plurality of chucks supported by said spindles, means supported by said spindles for operating said chucks, a plurality of fluid pressure operated means supported by said spindles and operatively connected to one of said last mentioned means, valve means for controlling the flow of fluid to a plurality of said fluid pressure operated means, said valve means having a plurality of pairs of ports adapted to be serially connected to said fluid pressure operated means and means operatively connected to said cam shaft and said valve means adapted to automatically actuate said valve means in predetermined timed relation to the indexing of said turret.

18. In a machine of the character described, the combination of a frame, a cam shaft rotatably supported by said frame, a spindle turret rotatably supported by said frame, means operatively connected to said cam shaft and said spindle turret adapted to periodically index said spindle turret, a plurality of spindles rotatably supported by said spindle turret, means for driving said spindles, clutch means for connecting and disconnecting said spindles with said means for driving said spindles, a chuck carried by each of said spindles, a fluid pressure operated motor carried by each of said spindles, means operatively connected to said fluid pressure operated motors and said chucks, a valve comprising relatively movable parts adapted to control the flow of fluid to a plurality of said motors, and means operatively connecting said cam shaft and said valve for actuating said valve in predetermined timed relation to the indexing of said turret.

19. In a machine of the character described, the combination of a frame, a cam shaft rotatably supported by said frame, a spindle turret rotatably supported by said frame, means operatively connected to said cam shaft and said spindle turret adapted to periodically index said spindle turret, a plurality of spindles rotatably supported by said spindle turret, means for driving said spindles, clutch means for connecting and disconnecting said spindles with said means, a chuck carried by each of said spindles, a fluid pressure operated motor carried by each of said spindles, means operatively connected to said fluid pressure operated motors and said chucks, a valve comprising relatively movable parts supported coaxially with said turret for controlling the flow of fluid to a plurality of said motors, and means operatively connecting said cam shaft and said valve for automatically actuating said valve in predetermined timed relation to the indexing of said turret.

20. In a machine of the character described, the combination of an indexible spindle turret, means for indexing said turret, a plurality of spindles rotatably supported by said turret and adapted to be indexed through a plurality of stations, each of said spindles comprising a movable member and a fluid pressure operated motor operatively connected to said movable member, valve means comprising relatively movable parts for controlling the flow of fluid to said fluid pressure operated motors, said valve means being provided with a plurality of pairs of ports adapted to be serially connected to said motors, and automatic means for producing relative movement between movable parts of said valve means in predetermined timed relation to the indexing of said turret independently of the indexing thereof.

21. In a machine of the character described, the combination of an indexible spindle turret, means for indexing said turret, a plurality of spindles rotatably supported by said turret and adapted to be indexed through a plurality of stations one of which is a loading station, each of said spindles comprising a movable member and a fluid pressure operated motor operatively connected to said movable member, valve means comprising relatively movable parts for controlling the flow of fluid to said fluid pressure operated motors, said valve means having ports adapted to supply fluid to all of said motors and to selectively disconnect the supply of fluid to the fluid pressure operated motor in the loading station, automatic means for producing relative movement between certain of the relatively movable parts of said valve means upon the indexing of said turret, and means for automatically producing relative movement between other of said relatively movable parts independent of the indexing of said character.

22. In a machine of the character described, the combination of an indexible spindle turret, means for indexing said turret, a plurality of spindles rotatably supported by said turret and adapted to be indexed through a plurality of stations one of which is a loading station, each of said spindles comprising a movable member and a fluid pressure operated motor operatively connected to said movable member, valve means comprising relatively movable parts adapted to control the flow of fluid to said fluid pressure operated motors, said valve means having ports adapted to control the supply of fluid to actuate all of said motors in one direction during the indexing of said turret and for selectively actuating the fluid pressure motor in the loading station in a reverse direction after the indexing of said turret, and means for automatically controlling said valve means in predetermined timed relation to the indexing of said turret.

23. In a machine of the character described, the combination of an indexible spindle turret, means for indexing said turret, a plurality of spindles rotatably supported by said turret and adapted to be indexed through a plurality of stations, each of said spindles comprising a movable member and a fluid pressure operated motor operatively connected to said movable member, valve means comprising relatively movable parts for controlling the flow of fluid to said motors, one of said parts being supported adjacent said turret and adapted to be indexed therewith, and another of said parts being supported adjacent said turret and adapted to be moved relative to the first mentioned of said parts, said first mentioned part being provided with ports communicating with one side of said fluid operated motors, said second mentioned part being provided with ports for supplying fluid to all of the ports in the first of said parts and for disconnecting the supply of fluid selectively to one of the ports in the first of said parts, means independent of the rotation of said turret for moving said parts relative to each other, and means for automatically moving said parts relative to each other in predetermined timed relation to the indexing of said turret and independent thereof.

24. In a machine of the character described, the combination of an indexible spindle turret, means for indexing said turret, a plurality of spindles rotatably supported by said turret and adapted to be indexed through a plurality of stations, each of said spindles comprising a movable member and a fluid pressure operated motor operatively connected to said movable member, a valve member supported adjacent said turret and adapted to index therewith, said valve member being provided with ports communicating with one side of said fluid pressure operated motors through which fluid is conducted to operate said motors in one direction, a second valve member supported adjacent said first valve member and movable relatively thereto, said second valve member being provided with ports adapted to supply fluid to all of said ports in said first valve member and for disconnecting the supply of fluid selectively to one of said ports in the first valve member, and means for automatically producing relative movement between said valve members in predetermined timed relation to the indexing of said turret and independent thereof.

25. In a machine of the character described, the combination of an indexible spindle turret, a plurality of slidable members supported by said turret, fluid pressure actuated means operatively connected to said slidable members, valve means comprising relatively movable parts provided with ports adapted to control the flow of fluid to said fluid pressure actuated means, means for simultaneously moving a plurality of said parts with said turret, and automatic means for producing relative movement between said parts in predetermined timed relation to the indexing of said turret.

26. In a machine of the character described, the combination of an indexible spindle turret, a plurality of slidable members supported by said turret, fluid pressure actuated means operatively connected to said slidable members, valve means comprising two relatively movable parts provided with ports adapted to control the supply of fluid to said fluid actuated means, means for simultaneously rotating both of said parts, means for rotating one of said parts relative to the other, and means for automatically actuating said last mentioned means in predetermined timed relation to the indexing of said turret.

27. In a machine of the character described, the combination of an indexible turret, a plurality of chucks supported by said turret, fluid pressure actuated means operatively connected to said chucks, valve means comprising two relatively movable parts provided with ports adapted to control the flow of fluid to said fluid pressure actuated means, means for moving both of said parts concomitant with said turret, means for moving one of said parts relative to the other, and means for automatically actuating said last mentioned means in predetermined timed relation to the indexing of said turret.

28. In a machine of the character described, the combination of an indexible turret, a plurality of chucks supported by said turret, fluid pressure actuated means operatively connected to said chucks, valve means comprising relatively movable parts provided with ports adapted to supply fluid to said fluid pressure actuated means, means for simultaneously moving a plurality of said parts, means for moving one of said parts relative to the other, and means for automatically actuating said last mentioned means in predetermined timed relation to the indexing of said turret.

29. In a machine of the character described, the combination of an indexible spindle turret, means for indexing said turret, a plurality of spindles rotatably supported by said turret and adapted to be indexed through a plurality of stations, each of said spindles comprising a movable member and a fluid pressure operated motor operatively connected to said movable member, a valve member supported coaxially with said turret and adapted to be indexed therewith, said valve member being provided with ports communicating with one side of said fluid operated motors through which fluid is conducted to operate said motors in one direction, a second valve member supported coaxially with said turret and adjacent said first valve member, said second valve member being provided with ports adapted to supply fluid to all of said ports in said first valve member and for disconnecting the supply of fluid selectively to one of said ports in the first valve member, and means for automatically moving said second valve member in predetermined timed relation to the indexing of said turret.

30. In a machine of the character described, the combination of an indexible spindle turret, means for indexing said turret, a plurality of slidable members supported by said turret, a plurality of fluid pressure actuated means operatively connected to said slidable members, a valve supported adjacent said turret and comprising two relatively movable parts provided with ports adapted to control the flow of fluid to a plurality of said fluid pressure actuated means, means for moving both of said parts concomitant with said turret, means for moving one of said parts relative to the other, and means for automatically actuating said last mentioned means in predetermined timed relation to the indexing of said turret.

31. In a machine of the character described, the combination of an indexible spindle turret, a plurality of slidable members supported by said turret, fluid pressure actuated means operatively connected to said slidable members, valve means supported coaxially with said turret and comprising two relatively rotatable parts provided with ports adapted to control the supply of fluid to said fluid actuated means, means for simultaneously rotating both of said parts, means for rotating one of said parts relative to the other, and means for automatically actuating said last mentioned means in predetermined timed relation to the indexing of said turret.

32. In a machine of the character described, the combination of an indexible turret, a plurality of chucks supported by said turret, fluid pressure actuated means operatively connected to said chucks, valve means supported coaxially with said turret and comprising two relatively movable parts provided with ports adapted to control the flow of fluid to said fluid pressure actuated means, means for indexing both of said parts with said turret, means for moving one of said parts relative to the other, and means for automatically actuating said last mentioned means in predetermined timed relation to the indexing of said turret.

33. In a machine of the character described, the combination of an indexible turret, a plurality of chucks supported by said turret, fluid pressure actuated means operatively connected to said chucks, valve means supported coaxially with said turret and comprising two relatively movable parts provided with ports adapted to supply fluid to said fluid pressure actuated means, means for moving both of said parts concomitant with said turret, means for moving one of said parts relative to the other, and means for automatically actuating said last mentioned means in predetermined timed relation to the indexing of said turret.

34. In a machine of the character described, the combination of an indexible spindle turret, means for indexing said turret, a plurality of spindles rotatably supported by said turret and adapted to be indexed through a plurality of stations, each of said spindles comprising a movable member and a fluid pressure operated motor operatively connected to said movable member, valve means supported coaxially with said turret and comprising two relatively movable parts for controlling the flow of fluid to said fluid pressure operated motors, said valve means being provided with ports for supplying fluid to all of said motors and for selectively disconnecting the supply of fluid to one of said motors, and automatic means for controlling said valve means in predetermined timed relation to the indexing of said turret and independent of the indexing thereof.

35. In a machine of the character described, the combination of an indexible spindle turret, means for indexing said turret, a plurality of spindles rotatably supported by said turret and adapted to be indexed through a plurality of stations one of which is a loading station, each of said spindles comprising a movable member and a fluid pressure operated motor operatively connected to said movable member, valve means supported coaxial with said turret and comprising relatively movable parts for controlling the flow of fluid to said fluid pressure operated motors, said valve means having ports adapted to supply fluid to all of said motors and to selectively disconnect the supply of fluid to the fluid pressure operated motor in the unloading station, and automatic means for actuating said valve means in predetermined timed relation to the indexing of said turret and non-synchronous therewith.

36. In a machine of the character described, the combination of an indexible spindle turret, means for indexing said turret, a plurality of spindles rotatably supported by said turret and adapted to be indexed through a plurality of stations, each of said spindles comprising a movable member and a fluid pressure operated motor operatively connected to said member, valve means supported coaxially with said turret and comprising two relatively movable parts adapted to control the flow of fluid to said fluid pressure operated motors, said valve means having ports for controlling the flow of liquid to actuate all of said motors in one direction and for selectively actuating one of said motors in a reverse direction, and automatic means for actuating said valve means in predetermined timed relation to the indexing of said turret and independent thereof.

37. In a machine of the character described, the combination of an indexible spindle turret, means for indexing said turret, a plurality of spindles rotatably supported by said turret and adapted to be indexed through a plurality of stations one of which is a loading station, each of said spindles comprising a movable member and a fluid pressure operated motor operatively connected to said movable member, valve means supported coaxially with said turret and comprising two relatively movable parts adapted to control the flow of fluid to said fluid pressure operated motors, said valve means having ports adapted to control the supply of fluid to actuate all of said motors in one direction during the indexing of said turret and for selectively actuating the fluid pressure motor in the loading station in a reverse direction after the indexing of said turret, and means for automatically actuating said valve means in predetermined timed relation to the indexing of said turret.

HARRY W. RUPPLE.